Oct. 28, 1930.                R. E. NEWELL                1,780,093
                      THERMOSTAT CONTROL APPARATUS
                       Original Filed Oct. 16, 1928

INVENTOR
Robert E. Newell
By Archworth Martin,
Attorney.

Patented Oct. 28, 1930

1,780,093

UNITED STATES PATENT OFFICE

ROBERT E. NEWELL, OF IRWIN, PENNSYLVANIA

THERMOSTATIC CONTROL APPARATUS

Application filed October 16, 1928, Serial No. 312,801. Renewed April 25, 1930.

My invention relates to regulating apparatus for heating systems, and more particularly to electro-thermal regulators adapted to co-operate with regulators already in use in such heat-regulating systems.

One object of my invention is to combine an electro-thermal regulator with various types of regulators already in use, to control in a more positive manner the temperature of the furnace.

Another object of my invention is to provide an electro-thermal regulator that is responsive to room temperatures and which will function in co-operation with a furnace regulator, to regulate the furnace in accordance with the demand, due to temperature changes, thereby resulting in a more sensitive regulator.

Another object of my invention is to compound the action of a standard type furnace regulator and a thermal device in a novel and efficient manner.

Still another object is to provide an electro-thermal regulator device that may be readily connected with an existing regulator for conjoint operation therewith, and provided with novel means for controlling the operation of the electro-thermal regulator.

Figure 1:
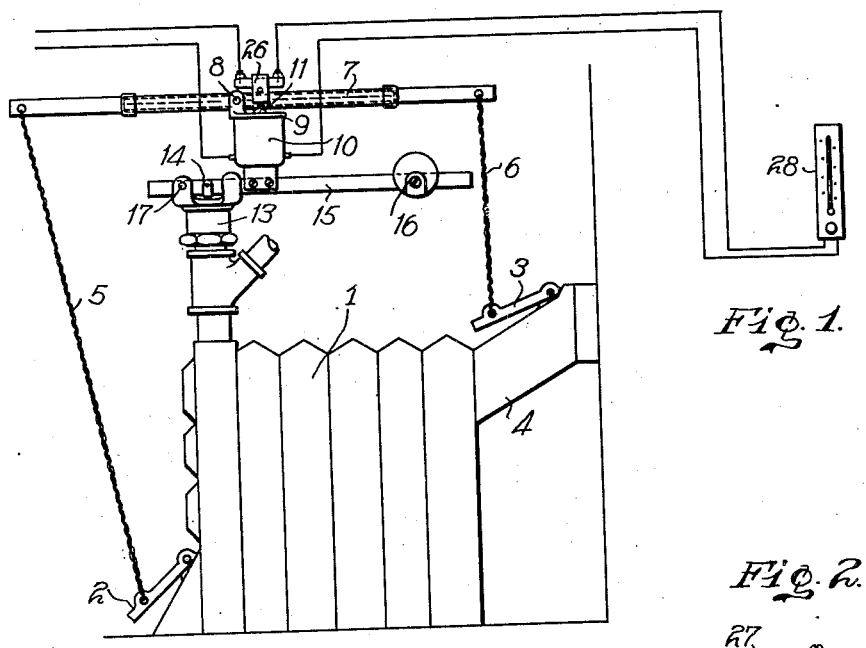
Figure 2:
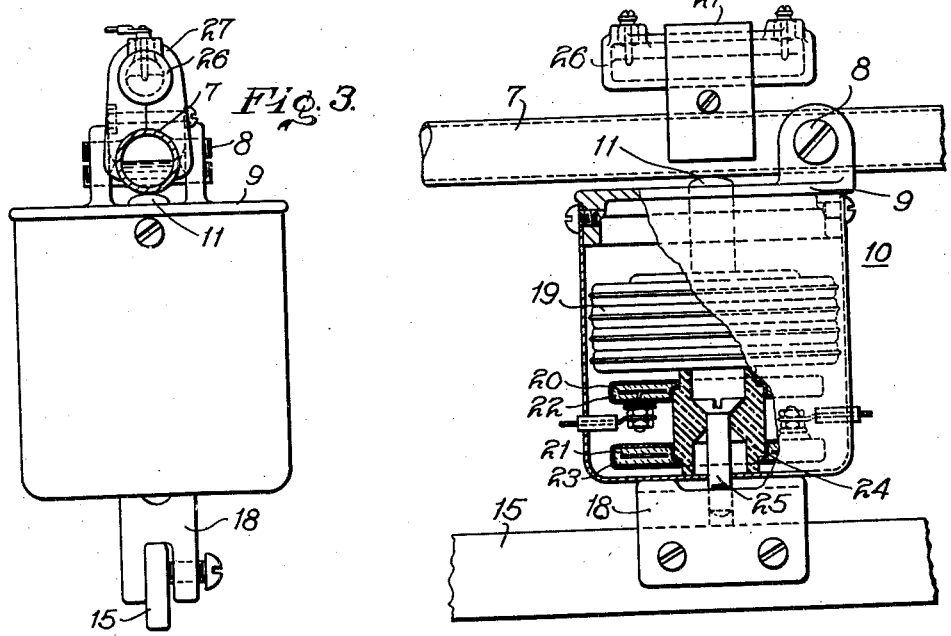
Figure 3:
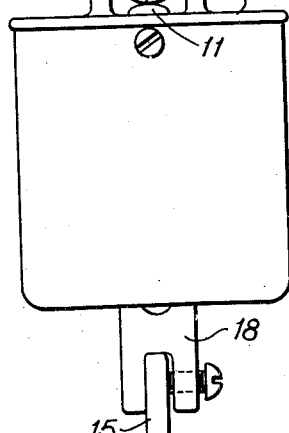
Figure 4:
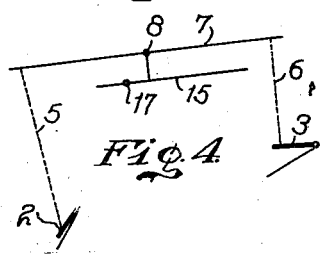
Figure 5:
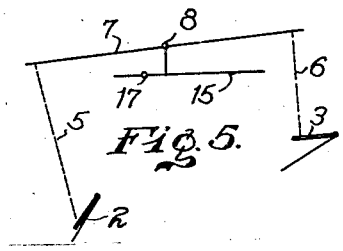

Other objects and advantages of my invention will be apparent in the detail description which is to follow, taken in conjunction with the accompanying drawings, wherein Figure 1 is a side elevational view of a typical furnace having a well-known type of regulator with my novel electro-thermal regulator mounted thereon; Fig. 2 is a side view partly in section, showing the details of the electro-thermal regulator and the novel control switch therefor; Fig. 3 is an end view of the regulator shown in Fig. 2, and Figs. 4 and 5 are diagrammatic views illustrating the operation of my regulator system.

Referring to Fig. 1 of the drawing, I show a furnace 1 having a damper 2 for controlling draft into the fire box of the furnace and a damper 3 for controlling draft through a flue pipe 4 that leads from the furnace. These dampers are operated through chains 5 and 6, respectively, each of which is connected to one of the dampers and to a hollow-operating lever or damper arm 7, which is pivotally mounted at 8 upon the removable cover 9, of a casing of an electro-thermal device 10. A plunger 11 operates through the cover or upper end of the casing, to oscillate the arm 7 about its pivot, so as to open and close the dampers 2 and 3 upon changes in room temperatures, as hereinafter explained. The arm 7 is partially filled with a liquid, preferably water, for automatically regulating the pressures at which the arm 7 will be oscillated.

The furnace 1 is adapted to be regulated by the operation of a well-known type regulator, wherein water from the heating system is supplied to a thermostat chamber 13 which contains an expansible element that will raise the plunger 14 to operate a damper arm 15. The arm 15 is provided with a weight 16 for regulating the pressures at which the arm 15 will be oscillated, as the arm is pivotally mounted at 17 upon the cover of the thermostat chamber 13. These pressures are further automatically regulated by the change in the center of gravity of the liquid weight of the upper arm 7.

In the ordinary practice of regulating a furnace, the above-mentioned chains 5 and 6 are connected to the damper arm 15, whereby the oscillations of the damper arm cause the dampers 2 and 4 to open or close as the temperature of the furnace changes. In practising my invention, however, I remove the chains 5 and 6 from the arm 15, and connect them to the damper arm 7 of the regulator mechanism hereinbefore described.

The casing of the device 10 is provided with a bifurcated lug 18 so that the regulator mechanism including the damper arm 7 may be securely attached to the arm 15, as by means of the clamp screws illustrated.

It will be seen that by thus securing the electro-thermal regulating device upon the damper arm of a standard type furnace regulator, regulation of the furnace will be more positive and efficient, as each device has an independent action of its own, to effect a compound action to regulate the furnace in accordance with the demand, due to temperature changes.

Referring to Figs. 2 and 3, the casing of the electro-thermal device 10, contains a thermo-sensitive or heat-responsive element 19 and resistor heaters 20 and 21. The thermal element 19 is preferably a bellows type thermostat, so that when heated will expand and operate the plunger 11. The thermal element 19 is adapted to be heated by the resistors 20 and 21, that may be of various well-known forms but as herein shown, are of the ribbon type. The resistor element of each resistor is shown as being embedded in refractory material 22 which is enclosed in a metal case 23.

The resistors are mounted on an insulating block member 24 and securely held in position against the lower edge of the casing by means of a screw 25 that passes through the casing and is threaded in the bifurcated lug 18.

By this construction, it will be seen that the electro-thermal regulator may be readily applied to the regulating arm of an existing regulator by an unskilled workman.

A gravity switch 26 is mounted on the damper arm 7 of the electro-thermal regulator 10 and functions to open the circuit of the resistors 20 and 21 when the damper arm is operated out of the horizontal position to a certain degree in either direction.

The switch 26 is a well-known type mercury switch, comprising a glass casing containing a predetermined amount of mercury therein and having two electrodes, one at each end of the casing, so that when the damper arm 7 is in substantially a horizontal position, a circuit will be completed through the switch. The switch 26 is readily secured to the damper arm 7 as by means of a clamp 27.

The circuit through the resistors 20 and 21, to heat the thermal element 19, is controlled by a thermal switch 28 that is located in a room which is to be heated by the furnace, so that when the temperature of the room increases to a predetermined degree, the thermal switch 28 will operate to complete a circuit for the resistors of the electro-thermal regulator 10.

Under normal operating conditions, the regulator will assume a position approximately as shown in Fig. 1. If the room temperature should rise above a predetermined degree, the room thermal switch 28 operates to complete a circuit for the heaters of the electro-thermal regulator 10. The thermal element 19 expands to operate the plunger 11 to oscillate the damper arm 7 about the pivot 8 in the proper direction to close the damper 2 and open the damper 3, as illustrated in Fig. 5. With the movement of the damper arm out of horizontal position to a certain degree, the switch 26 operates to open the circuit of the heaters, but sufficient heat will be retained in the casing of the electro-thermal device, to maintain the damper arm in the oscillated position for an interval of time. This time permits the room to cool sufficiently so that the regulator returns to the normal operating position.

If the temperature of the furnace rises above a predetermined degree, the thermostat 13 will operate to cause the damper arm 15 to oscillate about the pivot 17, as illustrated in Fig. 4. This action oscillates the entire electro-thermal regulator 10, causing the operation of the dampers 2 and 3. In this position the switch 26 opens so that the circuit for the heaters cannot be closed by the switch 28, thus preventing unnecessary consumption of electric current.

When the furnace cools sufficiently the regulator restores to normal operating position.

It will be seen that the electro-thermal regulator operates under control of the room temperatures, and that the furnace regulator operates under control of the furnace temperatures, and that the compound operation of each of these regulators results in a positive and sensitive regulator, and that the heating plant will be regulated in accordance with the demand for heat due to various changes in outside temperatures.

When the heating plant is not in use, the action of the thermostat 13 causes the operation of the gravity switch 26, as described, so that current will not be used, or other switches necessary to open the heater circuit.

By placing the electrically heated thermal element in a separate chamber and removed from the standard regulator, the thermal element is not affected in any manner by the high temperatures which might be present in the standard regulator. Thus the electro-thermal regulator may be applied for conjoint operation with various types of regulators.

It will be recalled that the damper arm 7 is partially filled with a liquid for automatically regulating the pressures at which the electro-thermal regulator or the furnace regulator will oscillate the damper arm. This liquid weight is provided so that the furnace control device will respond more rapidly to changes in temperature with a quick-acting movement.

As previously described, if the temperature of the furnace or the temperature of the room, or these temperatures simultaneously rise above a predetermined degree, the associated regulators operate the furnace control device to control the combustion in the furnace. By this operation, the arm 7 is caused to oscillate about either the pivot 8 or the pivot 17. When the arm 7 is slightly past a horizontal position, the liquid in the arm 7 flows to the opposite end, thereby suddenly overbalancing the arm. This overbalancing of the arm 7 imparts a snap action, in either direction, thereto, and causes combustion in the furnace to be more quickly regulated. This movement is especially desirable for operating fuel feeding valves, particularly where air or gas is used, as it is desirable to operate such valves with a positive and quick action.

Another feature of this construction is that the furnace will be regulated more quickly with a consequent saving in fuel. The temperature required to cause the thermostat to exert sufficient pressure to oscillate the arm 7 against the weight imposed thereon is maximum when the arm is initially moved, upon movement of the arm, the center of gravity of the liquid weight is changed to lessen the imposed weight, thus affording further movement of the arm without a material increase in temperature. Thus, considerable time is saved in obtaining sufficient regulatory movement of the furnace control device, and maintaining the temperatures more constant.

The electro-thermal regulator 10 is shown as located above the furnace in position to receive radiated heat from the furnace, which supplements the heating action of the electric resistors, thus securing quicker action of this regulator and effecting saving in current. The thermostat 13 could be dispensed with and radiated heat thus utilized to operate the thermostat 10 when the furnace becomes excessively hot, particularly if the thermostat 10 were located closer to the furnace than shown in the drawing.

Another advantage appears inasmuch as the electro-thermal device operates a relatively light weight sufficient to balance the dampers.

Various modifications and modes of operation may be made in my invention, without departing from the scope of the appended claims.

I claim as my invention:—

1. In a temperature regulating system, the combination with a furnace and a movable regulator member controlled by the temperature of said furnace, of a device indirectly controlled by room temperatures and mounted upon said member, and a device connected with the first-named device for controlling the furnace heat and actuated either by said member or the first-mentioned device, or both.

2. In a temperature regulating system, the combination with a furnace, an expansible element for said furnace and a member operated by said element, of an electro-thermal device mounted upon said member and movable therewith, a furnace control device pivotally mounted on said device, and means for oscillating said control device upon movement of the electro-thermal device, for effecting actuation of the furnace control device.

3. In a temperature regulating system, the combination with a furnace, an expansible element for said furnace and a member actuated by said element, of an electro-thermal device mounted upon said member, a furnace control device pivotally mounted on said device, means for imparting oscillating movement to said furnace control device, and means actuated by movement to a predetermined degree in either direction of said control device for controlling the operation of said electro-thermal device.

4. In a temperature regulating system, the combination with a furnace and a regulator member controlled by the temperature of said furnace, of an electro-thermal device operatively connected to said member and indirectly controlled by room temperatures, a furnace control device operatively connected to said electro-thermal device, and means actuated by the operation of said furnace controlling device for controlling the operation of said electro-thermal device.

5. Heat regulating apparatus comprising a pressure element controlled by furnace temperatures, a pressure element controlled by room temperatures, a furnace control device, means for imparting oscillatory movement to said device through action of said elements, a weight for imposing a predetermined operating pressure upon the first mentioned element, and means carried by the second mentioned element and responsive to movements of said furnace control device for automatically shifting a portion of said weight for effecting changes in the operating pressures of the first-mentioned element.

6. Heat-regulating apparatus comprising a pressure element controlled by furnace temperatures, a pressure element controlled by room temperatures, a furnace control device, means for imparting oscillatory movement to said device through the action of either or both of said elements, and means actuated by movement in either direction of said control device for automatically controlling the operating pressures of said pressure elements.

7. Heat-regulating apparatus comprising a pressure element controlled by furnace temperatures, a pressure element controlled by room temperatures, a furnace control device, means for imparting oscillatory movement to said device through the action of either or both of said elements, and a liquid weight actuated by movement of said furnace control device to a predetermined degree in either direction for overbalancing and operating said furnace control device.

8. The combination with a furnace, of temperature controlled apparatus therefor, comprising a thermostat affected by furnace temperatures, an electro-thermal thermostat directly affected by room temperatures, means for effecting control of combustion in the furnace through the action of either of said thermostats or their combined action, and means for interrupting the circuit of the second-named thermostat through operative movement of the first-named thermostat.

9. The combination with a furnace, of temperature controlled apparatus therefor, comprising a thermostat directly affected by furnace temperatures, an electro-thermal thermostat directly affected by room temperatures, means for effecting control of combustion in the furnace through the action of either of said thermostats or their combined action, and means for interrupting the circuit of the second-named thermostat through operative movement of said first-named thermostat.

10. In a temperature regulating system, the combination with a furnace and a movable regulator controlled by the furnace temperature, of an electro-thermal device mounted upon and movable with said regulator and controlled by room temperatures, and means operatively connected with said device for controlling the furnace heat, said means being actuated either by said member or said device or both.

11. In a temperature regulating system, the combination with a furnace, a movable control element for said furnace and a member operated by said element, of an electro-thermal device carried by said member and movable therewith, and a furnace control mounted for actuation by said device.

12. In a temperature regulating system, the combination with a furnace, a movable control element for said furnace and a member operated by said element, of an electro-thermal device carried by said member and movable therewith, a furnace control mounted for actuation by said device, and means actuated by a movement to a predetermined degree of said control for controlling the operation of said electro-thermal device.

13. In a temperature regulating system, the combination with a furnace having draft control means, of means for normally urging the draft control means in one direction, temperature responsive means actuated by an increase in boiler temperature for tending to move said draft control means in the opposite direction, and electro-thermal means actuated by an increase in room temperature for also tending to move said draft control means in a direction opposite to that first referred to, said temperature responsive means and electro-thermal means acting either in conjunction with or independently of each other and without interference one with the other.

14. In a temperature regulating system, the combination with a furnace having draft control means, of means for normally urging the draft control means in one direction, temperature responsive means actuated by an increase in boiler temperature for tending to move said draft control means in the opposite direction, electro-thermal means actuated by an increase in room temperature for also tending to move said draft control means in a direction opposite to that first-referred to, and other means actuated by movement to a predetermined degree of one of said preceding means for controlling the operation of said electro-thermal means.

15. In a temperature regulating system, the combination with a furnace and a regulator member controlled by the temperature of said furnace, of an electro-thermal device controlled by room temperatures, a furnace control device operatively connected to said electro-thermal device and to the regulator member, and means actuated by the operation of said furnace control device for controlling the operation of said electro-thermal device.

In testimony whereof I, the said ROBERT E. NEWELL have hereunto set my hand.

ROBERT E. NEWELL.